(12) United States Patent
John et al.

(10) Patent No.: US 10,485,082 B2
(45) Date of Patent: Nov. 19, 2019

(54) METHOD OF PROTECTING AND DETECTING A SURGE EVENT IN A NODE

(71) Applicant: General Electric Company, Schenectady, NY (US)

(72) Inventors: Ashbeel Younas John, Montreal (CA); Louis Bacon, Montreal (CA)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/400,017

(22) Filed: Jan. 6, 2017

(65) Prior Publication Data

US 2017/0347413 A1 Nov. 30, 2017

Related U.S. Application Data

(60) Provisional application No. 62/343,740, filed on May 31, 2016.

(51) Int. Cl.
*H05B 33/08* (2006.01)
*H05B 37/02* (2006.01)
*H05B 37/03* (2006.01)
*F21S 8/08* (2006.01)
*F21Y 115/10* (2016.01)
*F21W 131/103* (2006.01)

(52) U.S. Cl.
CPC ....... *H05B 37/034* (2013.01); *H05B 33/0887* (2013.01); *F21S 8/086* (2013.01); *F21W 2131/103* (2013.01); *F21Y 2115/10* (2016.08); *Y02B 20/341* (2013.01)

(58) Field of Classification Search
CPC ............... H05B 33/08; H05B 33/0815; H05B 33/0884; H05B 33/089; H05B 33/0893; H05B 37/02; H05B 37/03
See application file for complete search history.

(56) References Cited

U.S. PATENT DOCUMENTS

| 5,532,894 | A | * | 7/1996 | Sweaton | H02H 7/006 307/43 |
| 8,520,349 | B2 | * | 8/2013 | Billingsley | G01R 19/16547 361/91.1 |
| 2003/0123203 | A1 | * | 7/2003 | Telefus | H02H 9/005 361/58 |
| 2008/0258709 | A1 | * | 10/2008 | Shuey | G01R 19/16547 324/110 |
| 2012/0074784 | A1 | * | 3/2012 | Snijder | F21S 2/005 307/52 |
| 2012/0105228 | A1 | * | 5/2012 | Loveland | H05B 33/0803 340/540 |
| 2012/0154971 | A1 | * | 6/2012 | Brashear | H02H 3/22 361/118 |
| 2013/0100710 | A1 | * | 4/2013 | Kang | H02H 7/125 363/21.12 |

(Continued)

*Primary Examiner* — Thai Pham
(74) *Attorney, Agent, or Firm* — Buckley, Maschoff & Talwalkar, LLC

(57) ABSTRACT

Devices and methods for protecting against a surge in a luminaire are provided. For example, a controller for use with a luminaire is provided. The controller can include a first circuit configured to sense a surge in voltage or current. The controller can further include a second circuit configured to switch a relay in response to the first circuit having sensed the surge in voltage or current.

15 Claims, 10 Drawing Sheets

(56) References Cited

U.S. PATENT DOCUMENTS

| | | | |
|---|---|---|---|
| 2014/0036561 A1* | 2/2014 | Sakurai | H02M 7/217 363/126 |
| 2014/0191660 A1* | 7/2014 | Markle | H05B 33/089 315/119 |
| 2014/0354156 A1* | 12/2014 | Yang | H05B 33/0815 315/122 |
| 2015/0097484 A1* | 4/2015 | Lee | H05B 33/0848 315/85 |
| 2017/0141565 A1* | 5/2017 | White | H02H 9/001 |

\* cited by examiner

METHOD OF PROTECTING AND DETECTING A SURGE EVENT IN A NODE

CROSS-REFERENCE

The present invention is a non-provisional application claiming priority to provisional application No. 62/343,740 both filed on May 31, 2016, incorporated by reference herein in its entirety.

TECHNICAL FIELD

The present disclosure relates to luminaires. More particularly, the present disclosure relates to devices and methods for protecting against a surge in a luminaire.

BACKGROUND

Power surges caused by lightning and/or signal transients occurring on the electric distribution grid can cause an outdoor luminaire to remain turned on indefinitely. Specifically, after experiencing a surge, the luminaire can remain on during the day, when it would otherwise be automatically turned off. This type of failure is known as a "day burner" failure, and it can typically be pinpointed to the failure of one or more relays included in the luminaire.

A relay can fail because the high current densities resulting from a surge can lead to an above-rated power dissipation at the relay's contacts, causing them to melt and weld together. As such, the relay remains in the closed position indefinitely, and the luminaire thus remains on. Furthermore, the relay cannot be actuated in its open position in order to cut-off power delivery to the luminaire, because the relay's contacts are physically welded together.

This type of failure can cause an energy company to erroneously bill their customers (e.g. municipalities) for faulty light fixtures that are on all the time. Moreover, there can be high costs for the original equipment manufacturer (OEM) to service these parts once they are returned by the customer.

While relays having power dissipation, voltage, and current ratings higher than those of commonly used electromechanical relays can be employed to circumvent day burner failures, high-end relays can increase the overall cost of luminaires as well as the complexity of the control circuitry needed to operate the relays. As such, there is a need for devices and methods that can prevent day burner failures of luminaires without increasing cost or circuit complexity.

SUMMARY

The embodiments featured herein can help resolve the above-noted deficiencies as well as other deficiencies known in the art. For example, the embodiments allow electromechanical relays to withstand one or more power surges without having their contacts welded together, thus preventing a day burner failure. Moreover, in the embodiments, after a surge has been detected, a relay can be actuated in its open position before returning to its closed position, which limits the amount of power dissipation at the contacts. As such, the contacts are not welded together after a surge, and the relay remains operational. The electronic circuit that control the relay is not fast enough to react (Go contact Open) during the surge period that is extremely short (50-100 usec). Embodiments of this invention, force the relay to open just after a surge while the contact blade are still hot and easier to separate.

One embodiment provides a controller for use with a luminaire that includes a first circuit configured to sense a surge in voltage or current, which first circuit may be a surge detection circuit. The controller further includes a second circuit configured to switch a relay in response to the first circuit having sensed the surge in voltage or current, which second circuit may be a relay control circuit that can be part of a main logic circuit.

Another embodiment provides a controller for use with a luminaire. The controller can include a processor and a memory that includes instructions that, when executed by the processor, cause the processor to perform certain operations. The operations can include sensing a surge in voltage or current on a power line of the luminaire and generating a signal configured to switch a relay disposed between the power line and one or more light sources of the luminaire in response to the surge.

Another embodiment provides a method for use with a controller of a luminaire. The method can include sensing, by the controller, a power surge at one or more terminals of the luminaire. Furthermore, the method can include generating, by the controller, control signals configured to actuate a relay included in the luminaire in response to sensing the power surge.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility. Circuitry, methods, and devices configured to prevent day burner failures in luminaires are described in detail below, according to several non-limiting exemplary embodiments.

Figure 1:
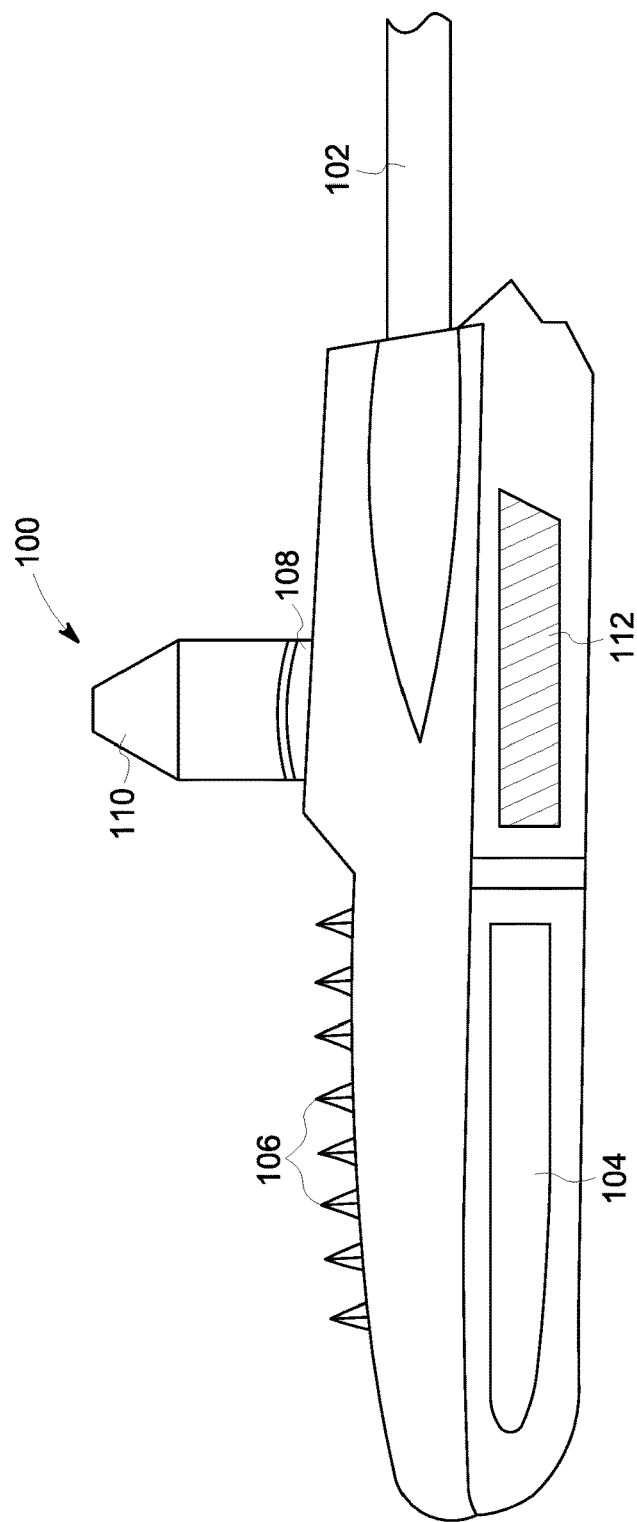
FIG. 1 illustrates a luminaire according to an embodiment.

FIG. 1 illustrates a luminaire 100, according to an embodiment. The luminaire 100 can be mounted on a horizontal bar 102 extending from a vertical pole (not shown). Generally speaking, however, the mounting configuration of the luminaire 100 can be arbitrary.

The luminaire 100 can include one or more light sources, such as light emitting diodes (LEDs). The light sources can be located in a cavity 104 of luminaire 100. The cavity 104 can be covered by a transparent glass or plastic cover to isolate the light sources from the elements. The glass cover may or may not serve as a lens.

The luminaire 100 can further include a fin 106 that is configured to passively allow heat to be extracted from electrical components located within the body of the luminaire 100 during operation. Furthermore, the luminaire 100 can include a receptacle 108 (e.g. an ANSI 7-pin socket) configured to mate with a node 110, which can provide a plurality of functionalities to the luminaire 100.

The node 110 can provide wireless connectivity to a data center to allow an operator to control one or more functions of the luminaire 100. For example, an operator can remotely program the luminaire 100 via the node 110 to alter its lumen output at given time periods.

In another example, an operator or a remote device can obtain power consumption data from the luminaire 100 for billing purposes. In yet another example, an operator can obtain maintenance and/or operational status data for the luminaire 100 in order to dispatch a technician to service luminaire 100. Generally, the luminaire 100 can be part of a wireless network, or a power line communication network, and it can be queried for data, it can receive commands, and it can automatically report data via the node 110.

The luminaire 100 can include additional hardware beyond those mentioned above. For example, the luminaire 100 can include a camera, which can be mounted in a cavity accessible through a door 112. Any one of the additional hardware can also be interfaced with the node 110 to provide remote connectivity, as described above.

Figure 2:
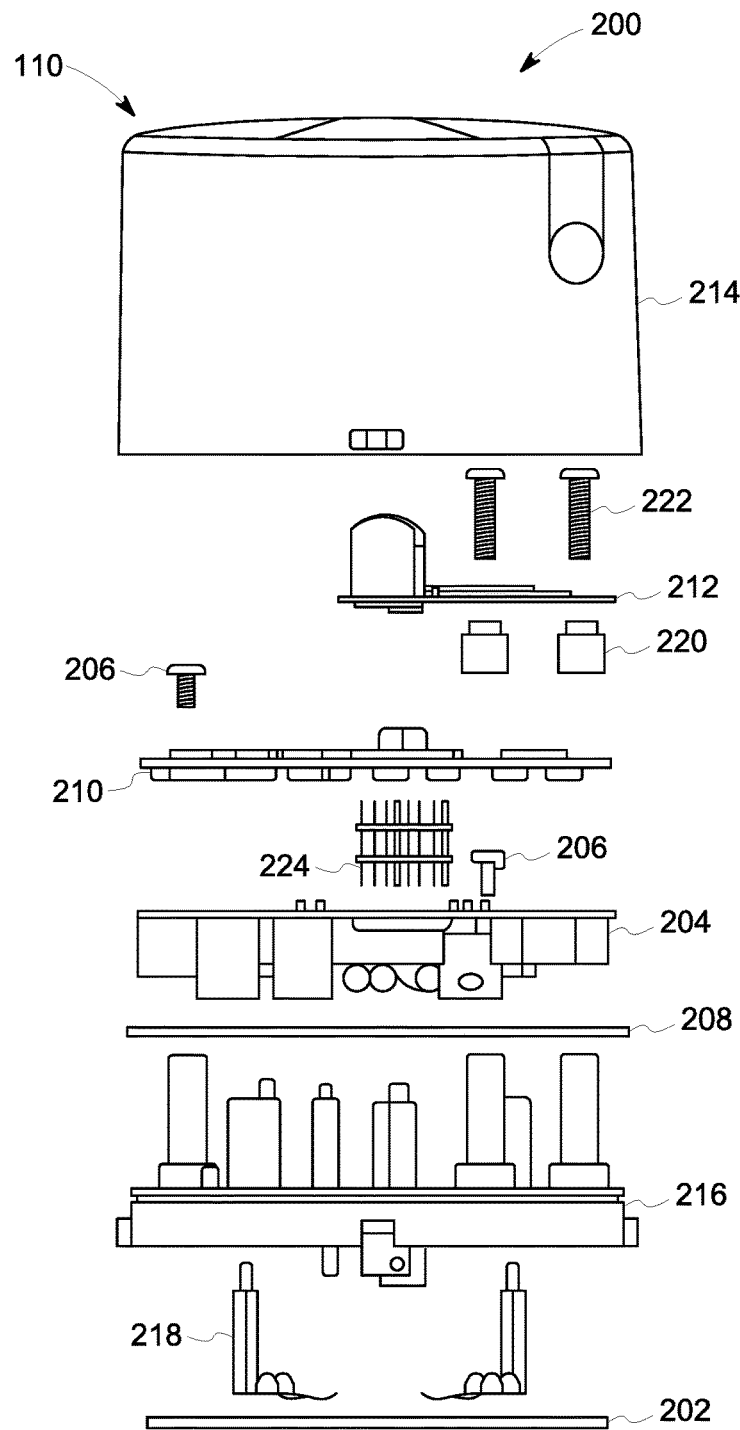
FIG. 2 illustrates an exploded view of a node, according to an embodiment.

FIG. 2 illustrates an exploded view 200 of the node 110, according to an embodiment. The node 110 can include a gasket 202 that provides a mating interface between the node 110 and a dorsal portion of the luminaire 100. For example, and not by limitation, the gasket 202 can be a sponge gasket.

The node 110 can further include a power supply unit 204, which can be a circuit board that includes one or more circuits configured to interface with a power line accessible via the socket onto which the node 110 is mounted. The one or more circuits can also interface with other subsystems included in the node and/or within the body of the luminaire 100. The interface between the power line, the power supply unit 204, and the aforementioned subsystems can be provided via a sub-assembly 216 fitted with brush contacts 218 that provide electrical connectivity.

The power supply unit 204 can be mounted on the sub-assembly 216 by a screw 206. Furthermore, the sub-assembly 216 can be fitted with an O-ring 208 at its base, in a peripheral groove, in order to provide a seal with the cover 214, which protects the various parts of the node 110.

The power supply unit 204 can further include rectifying circuits for converting AC voltages from the power line to DC voltages that can be used to power the aforementioned subsystems. Furthermore, the power supply unit 204 can also include surge protection circuitry.

The node 110 can further include a main board 210 and a network interface card 212. The main board 210 can be secured to the power supply unit 204 via another screw 206 and electrically connected to the power supply unit 204 by a header 224. Furthermore, the main board 210 can include metering circuitry and one or more processors that can be configured to log information. The information can be power consumption data, and/or generally, any measured data relating to voltage and current quantities between, for example, the power line and the neutral line of the ANSI socket onto which the node 110 is mounted.

The information can include historical data related to surge events. The historical data can include surge amplitudes (voltage and/or current), times of occurrence, surge duration, surge event frequency, and load circuit conditions during, after, or immediately before one or more surge events. A load circuit can be, for example, an LED driver circuit.

The network interface card 212 can include one or more circuits that are configured to provide network connectivity to the node 110. The network interface card 212 can be mounted on the main board 210 using a spacer 220 and a screw 222. Electrical connectivity to the main board 210 can be provide via a header (not shown), or using any other equivalent methods for connecting circuit boards together.

The node 110 can be connected to an RF mesh network via the network interface card 212. As such, the node 110 can transmit and receive data to and from a remote device, such as a gateway device. The gateway device can, in turn, be connected (via another network) to a data center where the performance of the node 110 can be monitored, via a web-based application, for example. An operator at the data center can also issue commands to the node 110 in order to cause the node 110 to perform various diagnostics and/or to alter its settings, for example.

Figure 3:
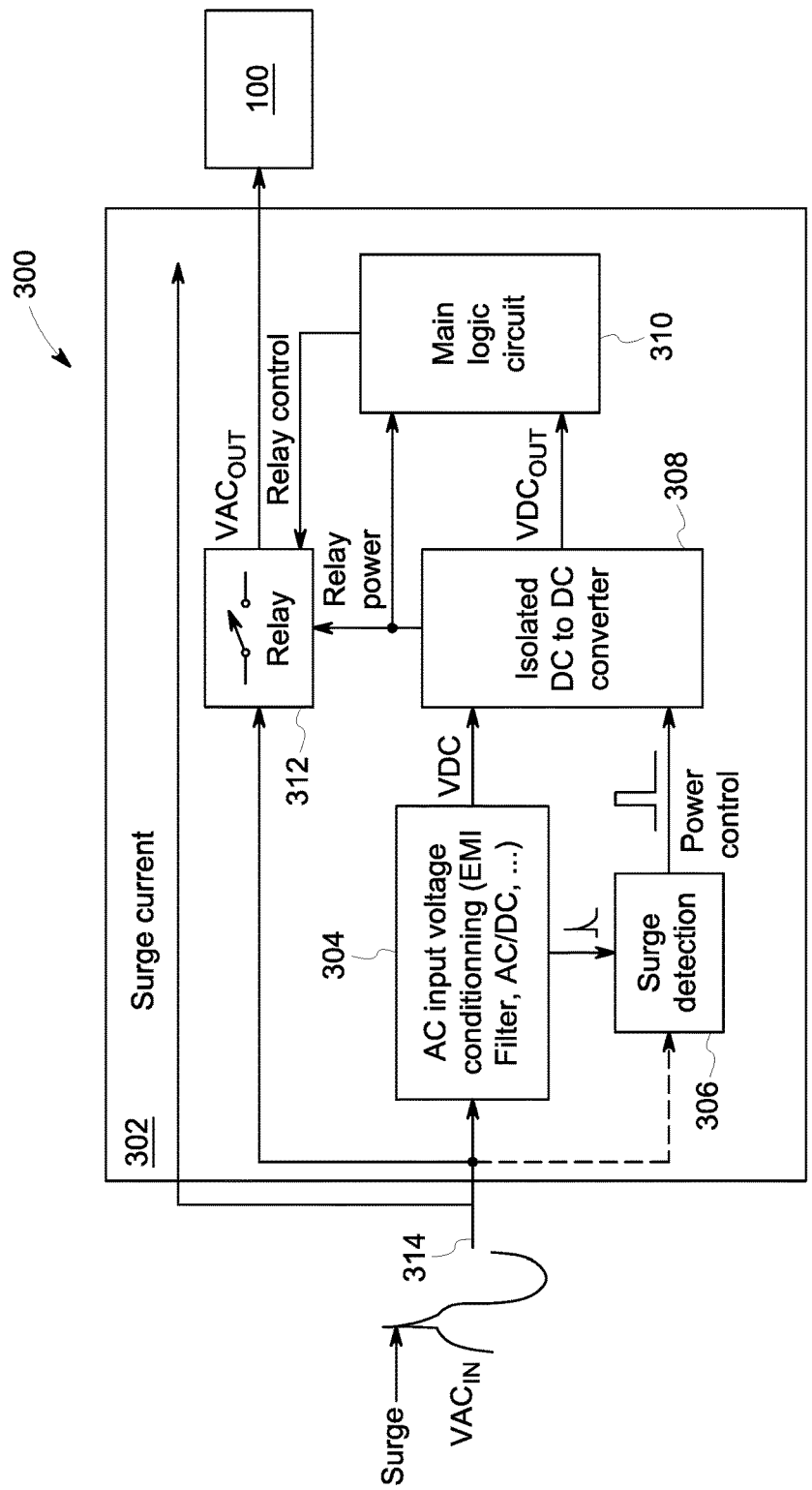
FIG. 3 illustrates circuitry in accordance with various aspects disclosed herein.

FIG. 3 illustrates circuitry 300 that can be included in the power supply unit 204, according to an embodiment. The circuitry 300 can include one or more circuits that cooperatively or individually function to protect one or more subsystems of the node 110 and/or of the luminaire 100. For example, the circuitry 300 can include a circuit 302 whose function is to protect a relay 312 from having its contacts welded as a result of a surge. In other words, the circuit 302 can permit the successful operation of the relay 312, even after multiple surges occur.

The circuit 302 can include a conditioning circuit 304 whose function is to regulate an AC voltage (VACIN) by filtering out noise, particularly noise due to electromagnetic interference (EMI). The conditioning circuit 304 can also convert the AC voltage on the power line 314 to provide a DC voltage for use by other sub-circuits of the circuit 302.

The circuit 302 can further include the relay 312, a DC converter circuit 308, a main logic circuit 310, and a surge detection circuit 306. By way of example, the surge detection circuit 306 can include a transient voltage suppression diode. The DC converter circuit 308 can step down a high DC input voltage provided by the conditioning circuit 304 to a lower DC voltage that is used to regulate the relay 312 and to supply the main logic circuit 310.

Depending on the digital state of the "RELAY CONTROL" signal provided to the relay 312 by the main logic circuit 310, the luminaire 100 is either in the ON or OFF state. As previously mentioned, unlike in the embodiment shown in FIG. 3, relays included in typical luminaire controllers can remain in the closed state after one or more surges, meaning that the luminaire would stay ON indefinitely, thus wasting power.

In the circuit 302, the surge detection circuit 306 can capture a surge signal directly from the power line 314 or from within the conditioning circuit 304. When a surge signal (e.g. the spike on the VACIN signal on the power line 314) is detected by the surge detection circuit 306, a digital pulse ("POWER CONTROL") is sent to the power control pin of the DC converter circuit 308. The "POWER CONTROL" pulse shuts down the internal supply VACOUT to the luminaire 100.

However, a pulse width of the "POWER CONTROL" pulse is chosen to temporarily shut down the internal supply. The internal supply is shut down long enough to allow the "RELAY POWER" signal to shut off the relay 312 but not long enough for the DC power (VDCOUT) of the main logic circuit 310 to go low. Consequently, the relay 312 is transiently actuated between its ON and OFF state after a surge has been detected, the relay 312 can be actuated repeatedly between the two states.

As such, the circuit 302 minimizes the risk of having relay contacts melting and sticking together after a surge current passes through the relay 312. This can be achieved by forcing the contact of the relay 312 to open for a short time after a surge occurs. The transient actuation of the relay 312 can be monitored and logged by a processor on the main board 210 by monitoring the relay power signal or by detecting a voltage sag in the supply (VDCOUT) of the main logic circuit 310.

Figure 4:
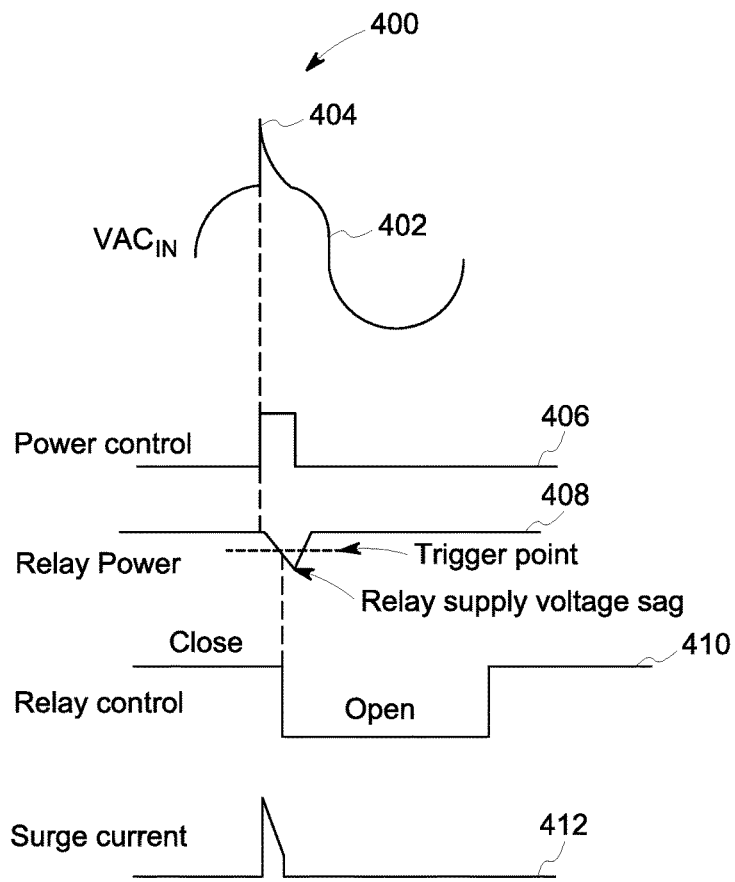
FIG. 4 depicts a timing diagram, according to an embodiment.

FIG. 4 illustrates a timing diagram 400, according to the operation of the embodiment described in FIG. 3. The timing diagram 400 includes an AC signal 402 that is present on the power line 314. The AC signal 402 can include a surge 404, as result of lightning for example. The surge 404 can also lead to a surge current signal 412.

Once the surge 404 is detected, POWER CONTROL signal 406 is asserted for a predetermined time. This causes the RELAY POWER signal 408 to develop a voltage sag, and a thresholding method can be used to record the occurrence of the sag by recording the instant at which the signal 408 crosses a trigger point.

The voltage sag in the signal 408 causes a relay control signal 410 to switch from CLOSE to OPEN (and then to switch back when the signal 406 and the signal 408 return to their original state.

Figure 5:
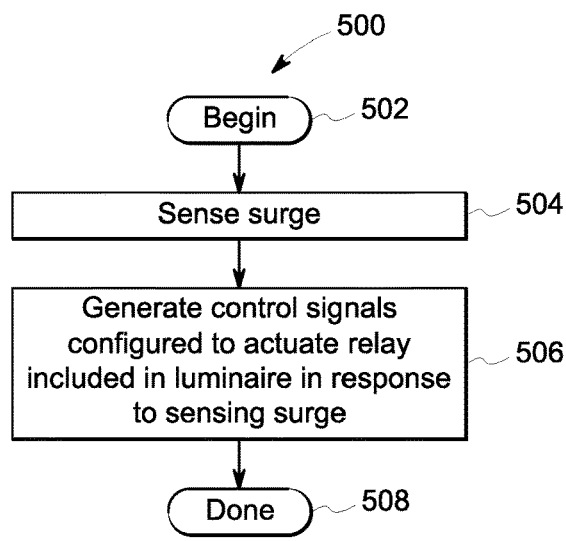
FIG. 5 illustrates a method in accordance with one embodiment.

Having set forth various embodiments and their structure, a method 500 consistent with their operation is now described with respect to FIG. 5. The method 500 can be executed by the hardware disclosed herein.

The method 500 beings at start block 502, and it includes sensing a surge (block 504) on a power line or a sub-circuit of a node electrically coupled to a luminaire. The method 500 includes generating one or more control signals that are configured to repeatedly actuate a relay included in the luminaire in response to sensing the power surge (block 506).

The method 500 can end at end block 508, but it can include a variety of intermediate steps not expressly shown in FIG. 5 but embodied in the operations of the various embodiments described herein. For example, the method 500 can include measuring and logging at least one electrical parameter of the power surge. The at least one electrical parameter can include an amplitude of the power surge. Furthermore, the method 500 can include logging data related to past power surges. And the method 500 can include transmitting to remote device, such as a gateway device, data related to power surges.

FIGS. 6-10 illustrate exemplary implementations of several modules included the circuit 302, and exemplary implementations of other modules that can be incorporated on the power supply unit 204 or in the main board 210.

Figure 6:
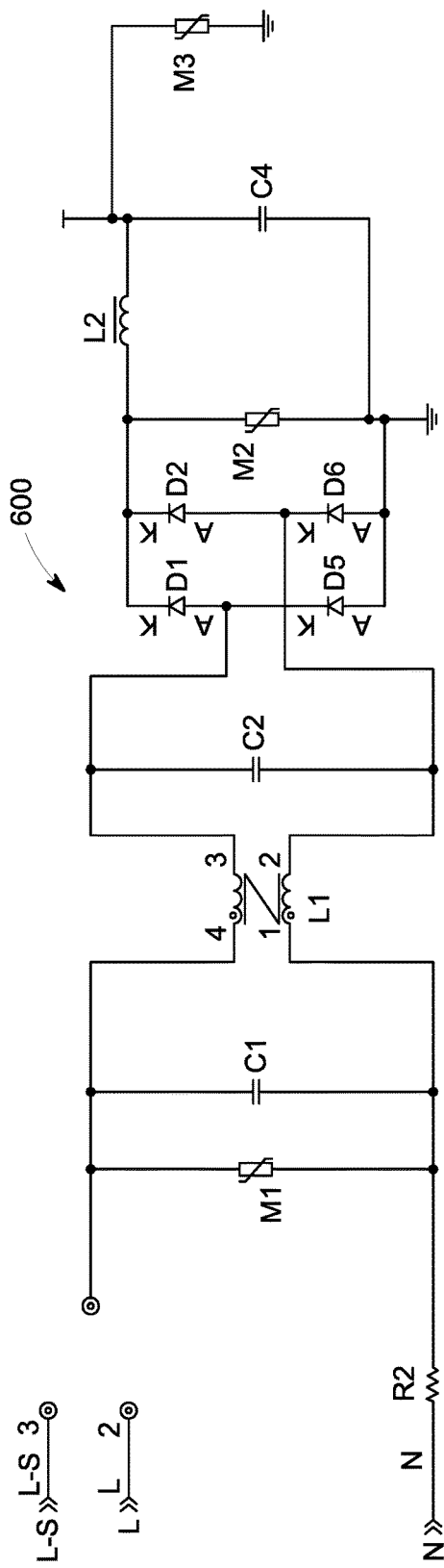
FIG. 6 illustrates circuitry in accordance with various aspects disclosed herein.

FIG. 6 illustrates an exemplary implementation 600 of the conditioning circuit 304 that is included in the circuit 302. In FIG. 6, components R2, M1, M2, and M3 are configured to perform surge protection. Components C1, C2, C4, L1, and L2 are configured to perform EMI filtering. Components D1, D2, D5, and D6 are configured to perform AC to DC rectification.

Other devices such as transient surge protectors (e.g. transient-voltage-suppression (TVS) diodes) or gas tubes can also be used for surge protection. Many EMI filtering configurations known in the art, such as single or dual stage configurations, can also be used without departing from the scope of the present disclosure.

Figure 7:
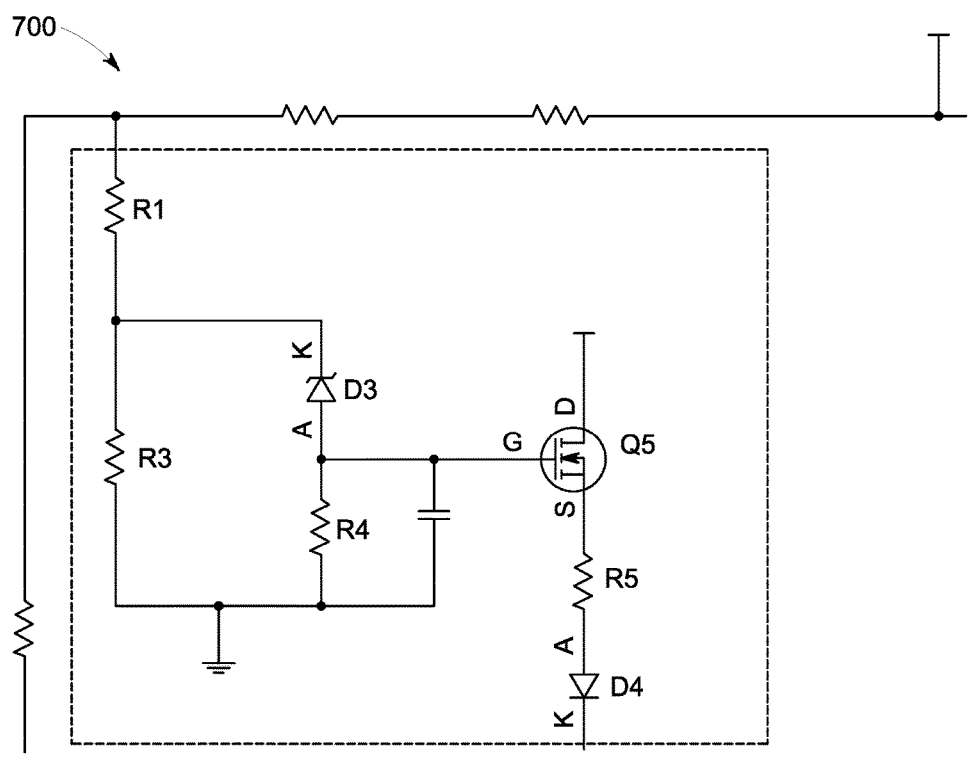
FIG. 7 illustrates circuitry in accordance with various aspects disclosed herein.

FIG. 7 illustrates an exemplary implementation 700 of the surge detection circuit 306 that is included in the circuit 302. In FIG. 7, components R1, R3, R4, and D3 are used to set the peak surge trigger point. Components Q5, R5, D4 form a buffer circuit that feeds the surge signal to the power control pin. It is noted that while transistor Q5 is shown as a MOSFET, a bipolar transistor can also be used.

Figure 8:
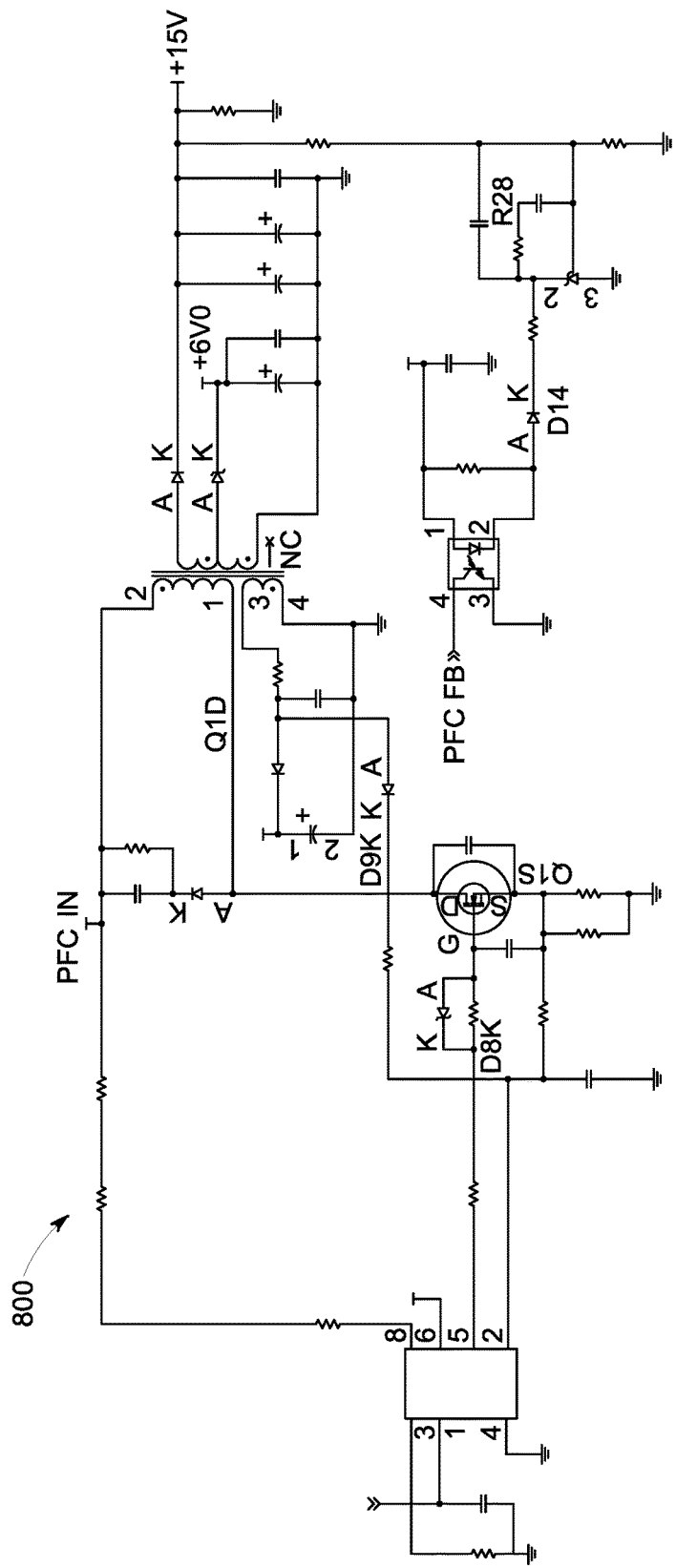
FIG. 8 illustrates circuitry in accordance with various aspects disclosed herein.

FIG. 8 illustrates an exemplary implementation 800 of the DC converter circuit 308 that is included in the circuit 302. In FIG. 8, the DC converter circuit 308 is a DC to DC power converter configured in a flyback topology. Other topologies of DC to DC converters can also be used. For example, SEPIC, CUK, and FORWARD configurations can also be used without departing from the scope of the present disclosure.

Figure 9:
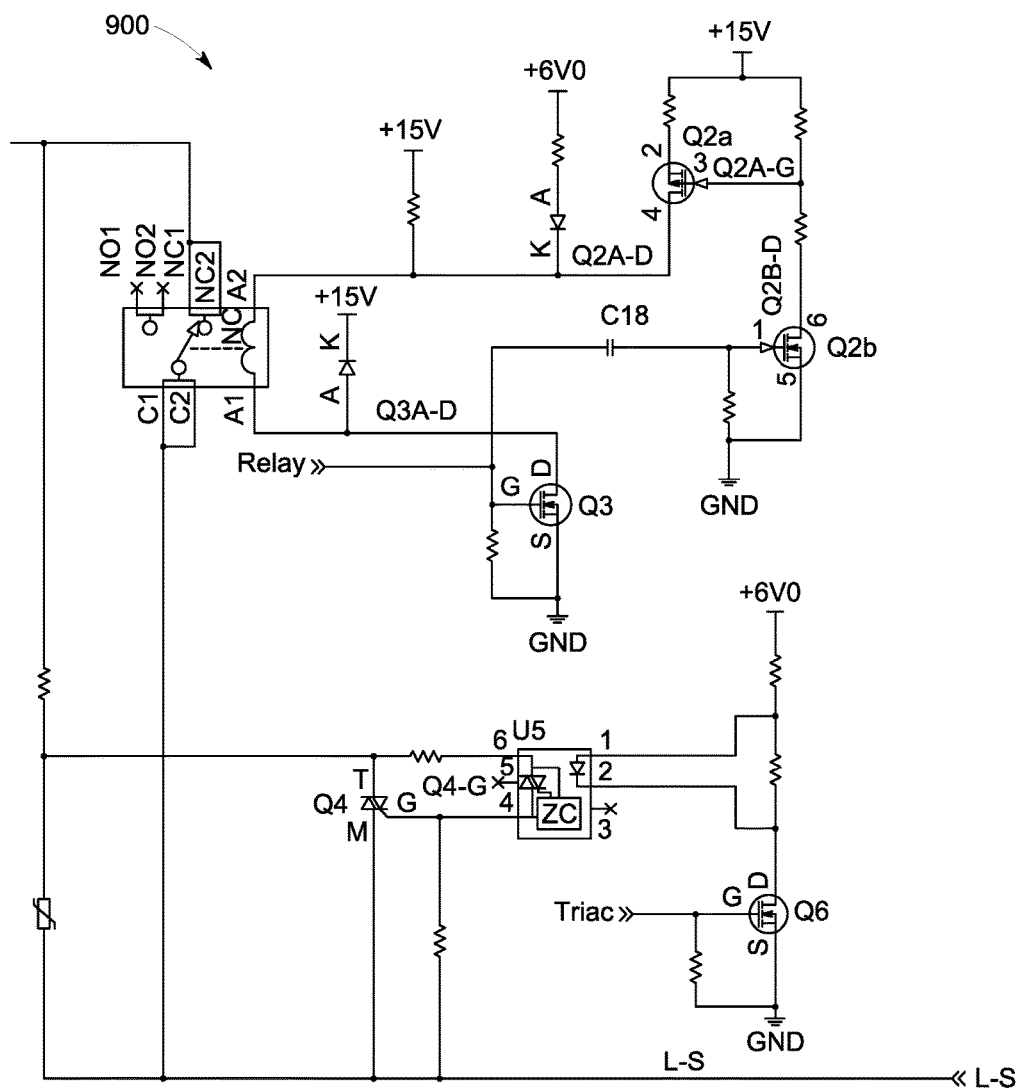
FIG. 9 illustrates circuitry in accordance with various aspects disclosed herein.

FIG. 9 illustrates an exemplary implementation of a relay control circuit 900 that can be part of the main logic circuit 310. In FIG. 9, components Q2a, Q2b, and Q3 are transistors that are part of a dual supply voltage relay driver circuit. Every time the relay is turned on, a high voltage (e.g. 15V DC) is applied on a 6 VDC relay for a short time to insure that the contact will not stick together following a surge. Components Q4, Q6, and U5 are used to reduce the in-rush current when the luminaire 100 is turned on.

Figure 10:
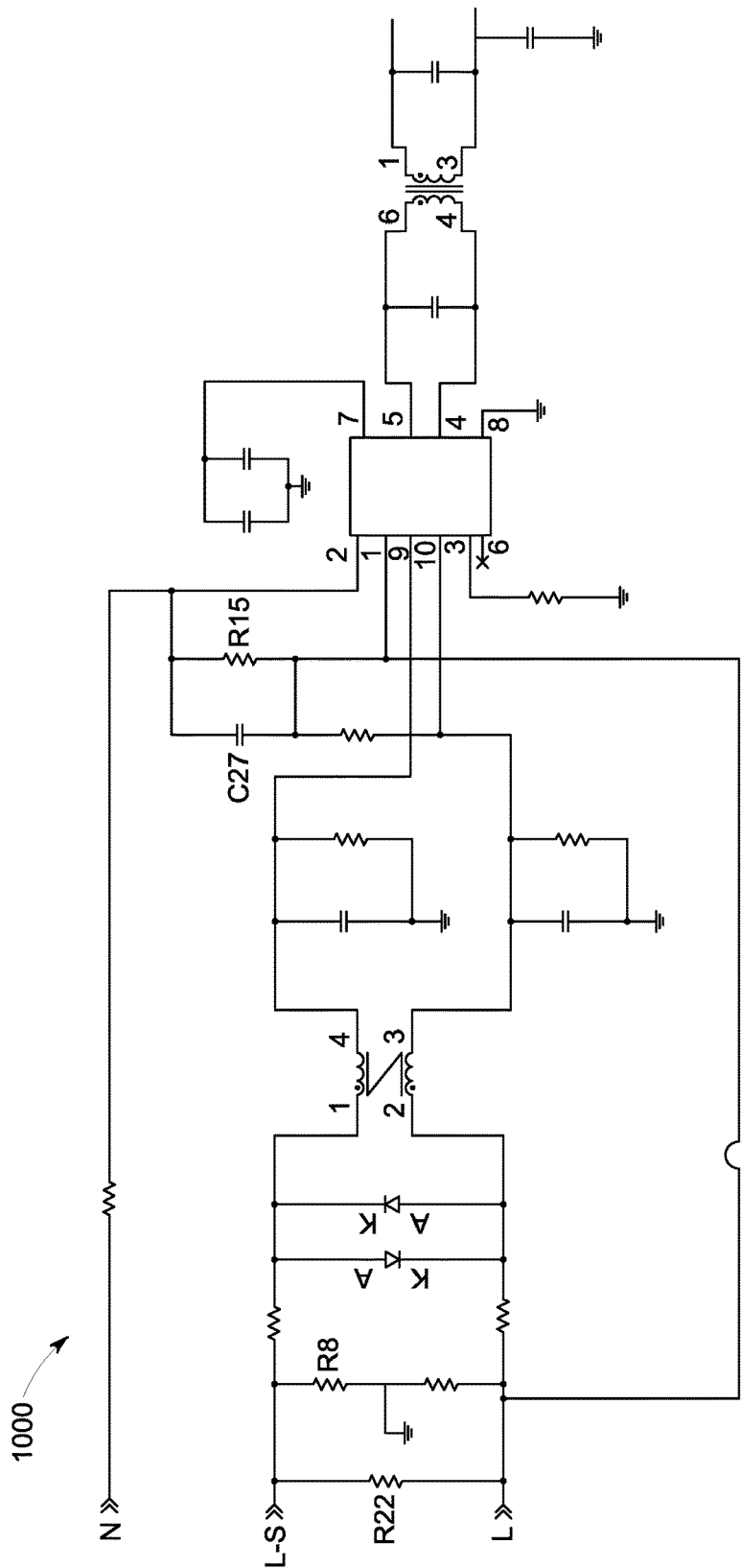
FIG. 10 illustrates circuitry in accordance with various aspects disclosed herein.

FIG. 10 illustrates a metering circuit 1000 that can be part of the main board 210. In FIG. 10, components R8, R15, and C27 for a divider circuit that is used to sense the AC input voltage from the power line 314. R22 is a shunt resistor used to sense the current consumed by the luminaire 100. The U1 chip and its surrounding components are parts of the metering circuit that provide information about the energy, power factor, and power consumption of the luminaire 100.

In the metering circuit 1000, the insulation between the AC line side and the main processor is provided by a pulse transformer. Other technologies, such as opto-couplers can also be used.

Figure 11:
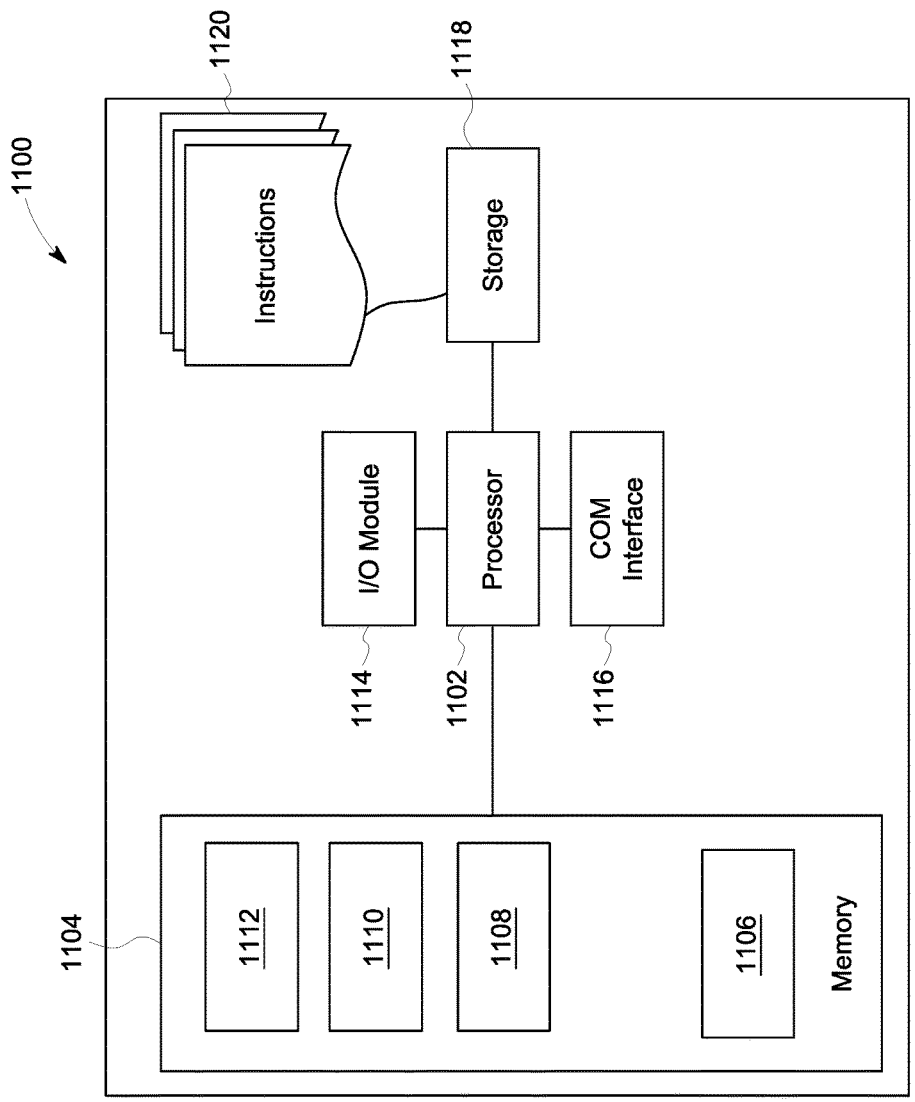
FIG. 11 illustrates a block diagram of a controller, according to an embodiment.

Having set forth various exemplary embodiments, a controller 1100 (or system) consistent with their operation is now described. FIG. 11 shows a block diagram of controller 1100, which can include a processor 1102 that has a specific structure. The specific structure is imparted to processor 1102 by instructions stored in a memory 1104 included therein and/or by instructions 1120 that can be fetched by processor 112 from a storage medium 1118. The storage medium 1118 may be co-located with controller 1100 as shown, or it may be located elsewhere and be communicatively coupled to controller 1100. In some embodiments, controller 1100 may be a system-on-a-chip (SoC) implementation, combining functionalities of at least one of the network interface card 212, the main board 210, and the power supply unit 204.

Controller 1100 can be a stand-alone programmable system, or it can be a programmable module located in a much larger system. For example, controller 1100 can be part of the main board 210 or part of the power supply unit 204.

Controller 1100 may include one or more hardware and/or software components configured to fetch, decode, execute, store, analyze, distribute, evaluate, and/or categorize information. Furthermore, controller 1100 can include an input/output (I/O) I/O module 1114 that is configured to interface with one or more gateway devices, for example.

Processor 1102 may include one or more processing devices or cores (not shown). In some embodiments, processor 1102 may be a plurality of processors, each having either one or more cores. Processor 1102 can be configured to execute instructions fetched from memory 1104, i.e. from one of memory block 1112, memory block 1110, memory block 1108, or memory block 1106, or the instructions may be fetched from storage medium 1118, or from a remote device connected to controller 1100 via communication interface 1116.

Furthermore, without loss of generality, storage medium 1118 and/or memory 1104 may include a volatile or non-volatile, magnetic, semiconductor, tape, optical, removable, non-removable, read-only, random-access, or any type of non-transitory computer-readable computer medium. Storage medium 1118 and/or memory 1104 may include programs and/or other information that may be used by processor 1102. Furthermore, storage medium 1118 may be configured to log data processed, recorded, or collected during the operation of controller 1100. The data may be time-stamped, location-stamped, cataloged, indexed, or organized in a variety of ways consistent with data storage practice.

In one embodiments, for example, memory block 1106 may include instructions that, when executed by processor 1102, cause processor 1102 to perform certain operations. The operations can include sensing a surge in voltage or current on a power line of the luminaire. The operations can further include generating a signal configured to repeatedly switch a relay disposed between the power line and one or more light sources of the luminaire in response to the surge. In general, the controller 1100 can perform the steps of the method 500.

Those skilled in the relevant art(s) will appreciate that various adaptations and modifications of the embodiments described above can be configured without departing from the scope and spirit of the disclosure. Therefore, it is to be understood that, within the scope of the appended clauses, the disclosure may be practiced other than as specifically described herein.

What is claimed is:

1. A controller for use with a luminaire, comprising:
   a surge detection circuit configured to sense a surge in voltage or current;
   a relay control circuit configured to repeatedly switch a relay in response to the surge detection circuit having sensed the surge in voltage or current;
   the controller including a first circuitry configured to measure at least one electrical parameter of the surge, and a second circuitry configured to transmit the at least one electric parameter of the surge to a remote device; and
   the second circuitry configured to send a signal after the surge is sensed to a direct current (DC) converter circuit to shut down an alternating current output voltage supply internal to the DC converter circuit.

2. The controller of claim 1, surge detection circuit includes a transient voltage suppression diode.

3. The controller of claim 1, wherein the surge detection circuit includes a flyback diode.

4. The controller of claim 1, wherein the surge detection circuit includes a bridge circuit.

5. The controller of claim 1, wherein the at least one electrical parameter includes an amplitude of the surge.

6. The controller of claim 1, further comprising a third circuitry configured to log the at least one electrical parameter of the surge.

7. The controller of claim 1, further comprising a fourth circuitry configured to log historical data indicative of past surges.

8. A controller for use with a luminaire, comprising:
   a surge detection circuit configured to sense a surge in voltage or current; and
   a relay control circuit configured to switch a relay in response to the surge detection circuit having sensed the surge in voltage or current;
   the controller including a first circuitry configured to measure at least one electrical parameter of the surge, and a second circuitry configured to transmit the at least one electric parameter of the surge to a remote device; and
   the second circuitry configured to send a signal after the surge is sensed to a direct current (DC) converter circuit to shut down an alternating current output voltage supply internal to the DC converter circuit.

9. The controller of claim 8, surge detection circuit comprising a transient voltage suppression diode.

10. The controller of claim 8, wherein the surge detection circuit includes a flyback diode.

11. The controller of claim 8, the surge detection circuit includes a bridge circuit.

12. The controller of claim 8, wherein the at least one electrical parameter includes an amplitude of the surge.

13. The controller of claim 8, further comprising a third circuitry configured to log the at least one electrical parameter of the surge.

14. The controller of claim 8, further comprising a fourth circuitry configured to log historical data indicative of past surges.

15. The controller of claim 14, wherein the historical data includes at least one selected from the group consisting of time of surge occurrence, surge duration, or surge event frequency.

* * * * *